June 24, 1930.　　D. B. WESTIN ET AL　　1,766,574

APPARATUS FOR HANDLING GLASSWARE

Filed June 1, 1926

INVENTORS
DANIEL B. WESTIN AND
HENRY W. INGLE
By Robson & Brown
Attorney

Patented June 24, 1930

1,766,574

UNITED STATES PATENT OFFICE

DANIEL B. WESTIN AND HENRY W. INGLE, OF HARTFORD, CONNECTICUT, ASSIGNORS TO HARTFORD-EMPIRE COMPANY, OF HARTFORD, CONNECTICUT, A CORPORATION OF DELAWARE

APPARATUS FOR HANDLING GLASSWARE

Application filed June 1, 1926. Serial No. 112,759.

Our invention relates to apparatus for handling glassware or other articles, and is herein shown and described as employed for transferring glassware from a given point, in an upright position, to a conveyer by which it is carried into a lehr.

One object of our invention is to provide means for transferring articles from one point to another point, by a device that has combined oscillatory and reciprocatory movements.

Another object of our invention is to simplify and improve generally the structure and operation of transfer devices.

Figure 1:
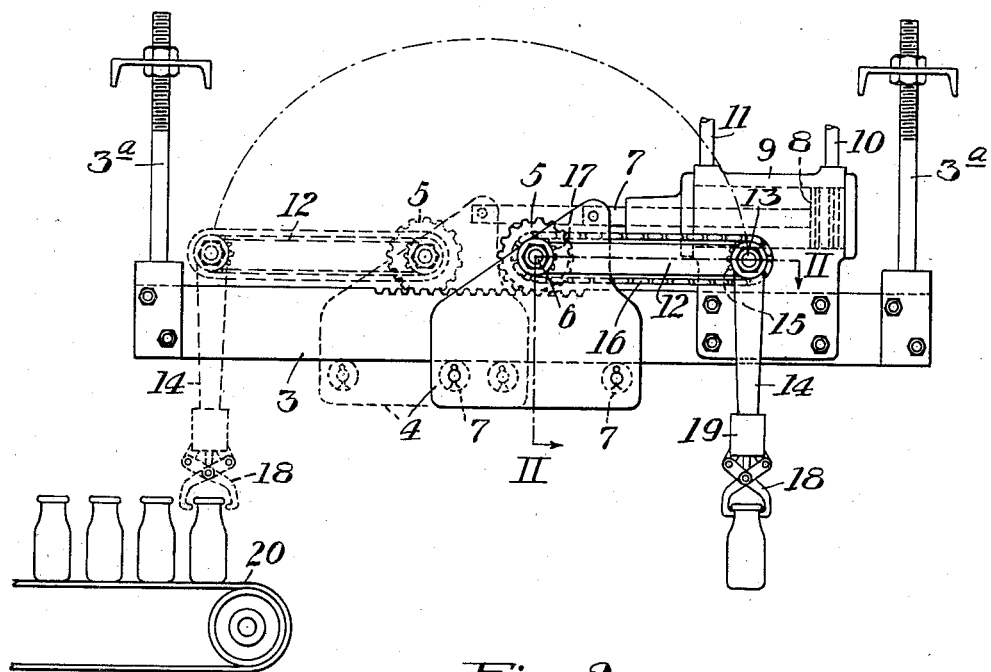
Figure 2:
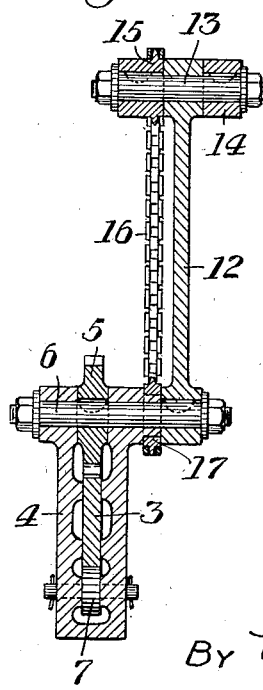

One form which our invention may take is shown in the accompanying drawing, wherein Fig. 1 is a side elevational view of apparatus embodying our invention, and Fig. 2 is a view taken on the line II—II of Fig. 1.

The transfer apparatus is shown as mounted on a supporting rail 3 that has rack teeth in its upper edge and which is suspended from any suitable support by bars 3ª that are vertically adjustable so as to adapt the apparatus to glassware of different heights.

The carriage 4 is supported upon the track 3 by a pinion 5 that is keyed to a shaft 6 which passes through the upper portion of the carriage. Anti-friction rollers 7 are provided in the lower corners of the carriage 4 to prevent tilting or binding of the carriage upon the rail 3. The carriage is moved back and forth on the rail 3 by a piston rod 7 and its piston 8. The piston 8 is disposed within a cylinder 9 and fluid pressure is admitted through a pipe 10 to move the carriage 7 along the track 3, to the position indicated in dotted lines. Return movement of the carriage is effected by admitting fluid pressure to the cylinder 9 through a pipe 11. An arm 12 is keyed to the shaft 6 so that as the carriage is moved along the track 3 the rack teeth effect rotative movement of the pinion 5, thus turning the arm 12, by a crank-like action, to the position indicated by dotted lines. Return movement of the arm is effected by movement of the carriage to the right.

A shaft 13 is rotatably mounted in the outer end of the arm 12 and supports an arm 14 that is keyed thereto. A sprocket wheel 15 is also keyed to the shaft 13 and a chain 16 passes around the sprocket wheel 15 and a sprocket wheel 17 that is rigidly secured to the carriage 4.

Upon movement of the carriage 4 toward the left, for instance, the rotative movement of the pinion 5 will rock the arm 12 as above described. During this movement of the arm 12, the arm 14 is moved about its pivot in such manner as to maintain it in vertical position, by reason of the fact that it has rigid connection with the sprocket 15 and such sprocket is given a rotative movement by the chain 16, because the sprocket 17 is the same size as sprocket 15 and does not have rotative movement about its center. This arrangement not only maintains the bottle in upright position throughout the transferring movement, but the arm 14 is at all times held against idle swinging movement.

From the foregoing it will be seen that not only is the ware transported a distance equal to twice the length of the arm 12, but that the arm 12 is caused to travel longitudinally of the track 3, thus increasing the horizontal distance through which the bottles are transported.

Tongs 18 are carried by the arm 14, and may be closed and opened, to engage and release the ware, by piston and cylinder mechanism indicated at 19. This mechanism may be of any well known type, and preferably operated by fluid pressure. The ware is shown as being transferred from a receiving station to a lehr conveyer 20.

Distribution of the ware may be made laterally of the conveyer, by shifting the forward end of the rail 3 transversely of the conveyer, in any suitable manner.

While the invention has been shown and described as transferring ware to the conveyer of a lehr, it will be understood that it is also adapted to be employed either as a takeout device for removing the ware from the molds of a shaping machine and depositing it either on a buck or directly upon a lehr conveyer, or it may be employed as a transfer device for transferring blanks or parisons from the blank molds to the blow molds of a shaping machine, and particularly if these molds are disposed at an appreciable distance from each other.

In this, and in other respects, the invention may be modified in construction, arrangement and mode of operation, without departing from the scope of the invention as defined in the appended claims.

We claim as our invention:

1. Apparatus for handling glassware comprising a support, a carriage mounted on said support for movement thereon toward and away from a ware receiving station and a ware delivering station, ware transferring means mounted on said carriage, means for moving said transferring means about a horizontal axis to transfer ware from said receiving station to said ware delivering station, ware holding means mounted on said transferring means, and means for actuating said holding means at said stations to grasp and release the ware.

2. Apparatus for handling glassware comprising a support, a carriage mounted on said support for movement thereon toward and away from a ware receiving station and a ware delivering station, ware transferring means mounted on said carriage, means for moving said transferring means about a horizontal axis simultaneously with the movement of said carriage to transfer ware from said ware receiving station to said ware delivering station, ware holding means mounted on said transferring means, and means for actuating said holding means at said stations to grasp and release the ware.

3. Apparatus for handling glassware comprising a support, a carriage mounted on said support for movement thereon toward and away from a ware receiving station and a ware delivering station, an arm mounted on said carriage, means for moving said arm about a horizontal axis to transfer ware from said receiving station to said ware delivering station, ware holding means including ware-gripping members mounted on said arm, and means for actuating said gripping members at said stations to grasp and release the ware.

4. Apparatus for handling glassware comprising a support, a carriage mounted on said support for movement thereon toward and away from a ware receiving station and a ware delivering station, an arm mounted on said carriage for movement about a horizontal axis, ware holding means including ware gripping members mounted on said arm, means for swinging said arm simultaneously with the movement of said carriage from a position to the rear of said carriage to a position forwardly thereof, and means for moving said ware gripping members relative to said arm at said stations to grasp and release the ware.

5. Apparatus for handling glassware comprising a carriage mounted for movement toward and from a ware-delivering point, an arm mounted on said carriage for oscillatory movement in a curved path, a ware-supporting arm pivoted to the outer end of the first named arm, and means for varying the relative angular positions of said arms during movement of said carriage.

6. Apparatus for handling glassware comprising a carriage mounted for reciprocable movement, an arm mounted on said carriage for oscillatory movement in a curved path, a ware-supporting arm pivoted to the outer end of the first named arm, and means for positively controlling the relative angular positions of said arms during movement of said carriage.

7. Apparatus for handling glassware comprising a fixed toothed rack, a pinion meshing at all times with said rack, a carriage to which the pinion is connected, means for moving the carriage longitudinally of the rack, an arm connected to and extending radially of said pinion, and ware-supporting means on the outer end of said arm, whereby points on said arm spaced from the axis of said pinion move in cycloidal paths.

8. Apparatus for handling glassware comprising a toothed rack, a pinion meshing with said rack, a carriage to which the pinion is connected, means for moving the carriage longitudinally of the rack, an arm connected to and extending radially of said pinion, ware-supporting means on the outer end of said arm, and means for varying the angularity of said ware-supporting means with respect to said arm, in predetermined relation to the movement of said pinion.

9. Article handling apparatus comprising a member pivotally supported at one end, article-carrying means on the other end of said member, means for effecting bodily movement of said member in a vertical plane from an article-receiving position toward a delivering point, and means for simultaneously moving the last named end of said member about the first named end as an axis.

10. Article-handling apparatus comprising a horizontally disposed track, a wheel mounted for traveling movement on said track, an arm having one of its ends connected to said wheel, a ware-supporting arm connected to the outer end of said arm, and means for varying the relative angular positions of said arms in predetermined relation to movement of said wheel, to maintain the ware-supporting arm in vertical position.

11. Article-handling apparatus comprising a track, a carriage, a wheel on said track and supporting the carriage, means for reciprocating the carriage longitudinally of the track, a sprocket wheel rigidly connected to the carriage, an arm connected at one of its ends to the first named wheel, and extending radially thereof, a sprocket wheel rotatably connected to the other end of said arm, a chain passing around said sprocket wheels, and a ware-supporting arm connected to the second named sprocket, whereby upon rotative movement of the first named wheel the first named arm will have pivotal movement with respect to the carriage, and the second named arm will be maintained in a predetermined angular position relative to the track.

12. Apparatus for handling glassware comprising an arm, ware holding means carried by said arm, means for moving said arm bodily between a ware receiving station and a ware delivering station, and for simultaneously swinging said arm about a horizontal axis, whereby said ware holding means traverses a cycloidal path in moving from one of said stations to the other, and means for automatically actuating said ware holding means to receive and release the ware.

13. Apparatus for handling glassware comprising a track, a carriage mounted on said track, means for reciprocating said carriage on said track, an arm mounted on said carriage for swinging movement about a horizontal axis between a ware receiving station and a ware delivering station, ware holding means carried by said arm, means operatively connecting said arm with said track for translating the reciprocatory movement of the carriage thereon into oscillatory movement of said arm about said axis, and means for automatically actuating said ware holding means to receive ware at said ware receiving station and for releasing it at said ware delivery station.

14. Apparatus for handling glassware, comprising an arm mounted for oscillatory movement about a horizontal axis, take-out tongs pivotally mounted on said arm, a sprocket wheel mounted in fixed relation co-axially with the axis of swing of said arm, a sprocket wheel mounted on said tongs and in fixed relation thereto, and a sprocket chain connecting said sprocket wheels and adapted to maintain said tongs vertically disposed throughout the swinging movement of said arm.

15. Apparatus for handling glass ware, comprising a supporting member mounted for movement in a given path, an arm pivotally connected to said member, a ware-supporting device connected to said arm at a point removed from said pivotal connection, and a single means for effecting an uninterrupted simultaneous movement of said member in its path and said arm on its pivot all in a vertical plane from one angular position with respect to said path to another angular position relative thereto.

Signed at Hartford, Connecticut, this 27th day of May, 1926.

DANIEL B. WESTIN.
HENRY W. INGLE.